United States Patent
Iguchi et al.

(10) Patent No.: US 12,400,796 B2
(45) Date of Patent: Aug. 26, 2025

(54) ELECTRONIC COMPONENT

(71) Applicant: TDK CORPORATION, Tokyo (JP)

(72) Inventors: Toshihiro Iguchi, Tokyo (JP); Hisashi Kobayashi, Tokyo (JP); Norihisa Ando, Tokyo (JP); Kenya Tamaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 159 days.

(21) Appl. No.: 18/359,319

(22) Filed: Jul. 26, 2023

(65) Prior Publication Data
US 2024/0087812 A1 Mar. 14, 2024

(30) Foreign Application Priority Data
Sep. 8, 2022 (JP) ................................. 2022-143135

(51) Int. Cl.
*H01G 4/232* (2006.01)
*H01G 4/30* (2006.01)

(52) U.S. Cl.
CPC ............ *H01G 4/2325* (2013.01); *H01G 4/30* (2013.01)

(58) Field of Classification Search
CPC .............................. H01G 4/2325; H01G 4/30
See application file for complete search history.

(56) References Cited

U.S. PATENT DOCUMENTS

| | | | | |
|---|---|---|---|---|
| 6,081,416 A | * | 6/2000 | Trinh | H01G 4/232 361/813 |
| 2009/0237865 A1 | * | 9/2009 | Komazawa | H01G 9/012 29/25.03 |
| 2009/0296311 A1 | * | 12/2009 | Otsuka | H01G 4/2325 361/306.3 |
| 2012/0073129 A1 | * | 3/2012 | Abe | H01G 4/30 29/825 |
| 2015/0187495 A1 | * | 7/2015 | Maeda | H01G 4/30 361/303 |
| 2017/0186539 A1 | * | 6/2017 | Masuda | H01G 2/06 |
| 2018/0294100 A1 | * | 10/2018 | Ando | H01G 4/30 |

FOREIGN PATENT DOCUMENTS

JP H02-045620 U 3/1990

* cited by examiner

*Primary Examiner* — Michael P McFadden
(74) *Attorney, Agent, or Firm* — Oliff PLC

(57) ABSTRACT

An electronic component includes a component body, a metal terminal, and a bonding material. The component body includes an element body and an external electrode. The metal terminal includes a first main surface and a second main surface, and a side surface. The bonding material electrically and physically connects the external electrode and the metal terminal. The metal terminal includes a first metal layer including the first main surface, a second metal layer including the second main surface, and a terminal body including the side surface. The terminal body is exposed at the side surface, and the first metal layer and the second metal layer are separated from each other on the side surface. Each of the first metal layer and the second metal layer includes a Ni plated layer. The terminal body includes Cu. The bonding material includes solder.

10 Claims, 10 Drawing Sheets

Fig.7

| SAMPLE | THICKNESS OF TERMINAL BODY (mm) | ESR (Ω) |
|---|---|---|
| S1 | 0.03 | 0.012 |
| S2 | 0.05 | 0.009 |
| S3 | 0.1 | 0.008 |
| S4 | 0.3 | 0.007 |

*Fig.8*

| SAMPLE | THICKNESS OF Ni PLATED LAYER (μm) | ESR (Ω) | CROTCH TEAR STRENGTH (N) |
|---|---|---|---|
| S5 | 0.6 | 0.007 | 19 |
| S6 | 1.1 | 0.007 | 32 |
| S7 | 1.7 | 0.008 | 39 |
| S8 | 3.9 | 0.009 | 41 |
| S9 | 4.4 | 0.013 | 44 |

Fig.9

| SAMPLE | SHORTEST DISTANCE L1a (mm) | ESR (Ω) |
|---|---|---|
| S10 | 0.5 | 0.007 |
| S11 | 0.98 | 0.009 |
| S12 | 1.44 | 0.014 |

Fig.10

| SAMPLE | SHORTEST DISTANCE L3a (mm) | ESR (Ω) |
|---|---|---|
| S13 | 0.34 | 0.008 |
| S14 | 0.88 | 0.009 |
| S15 | 1.33 | 0.013 |

ELECTRONIC COMPONENT

CROSS-REFERENCE TO RELATED APPLICATIONS

This application is based upon and claims the benefit of priority from Japanese Patent Application No. 2022-143135, filed on Sep. 8, 2022. The entire contents of which are incorporated herein by reference.

BACKGROUND

Field

The present disclosure relates to an electronic component.

Description of the Related Art

Known electronic components include a component body, a metal terminal, and a bonding material that connects the component body and the metal terminal (for example, refer to Japanese Unexamined Utility Model Publication No. H2-45620). The component body includes an element body and an external electrode disposed on the element body. The bonding material electrically and physically connects the external electrode and the metal terminal.

SUMMARY

An object of an aspect of the present disclosure is to provide an electronic component that reduces a decrease in mechanical strength of a metal terminal and reduces an increase in transmission loss due to a skin effect in a high frequency range.

An electronic component according to one aspect of the present disclosure includes a component body, a metal terminal, and a bonding material. The component body includes an element body and an external electrode disposed on the element body. The metal terminal includes a first main surface and a second main surface opposing each other, and a side surface coupling the first main surface and the second main surface. The bonding material is disposed between the external electrode and the first main surface, and electrically and physically connects the external electrode and the metal terminal. The metal terminal includes a first metal layer including the first main surface, a second metal layer including the second main surface, and a terminal body including the side surface. The terminal body is exposed at the side surface, and the first metal layer and the second metal layer are separated from each other on the side surface. Each of the first metal layer and the second metal layer includes a Ni plated layer. The terminal body includes Cu. The bonding material includes solder.

In the one aspect, each of the first and second metal layers includes a Ni plated layer. Therefore, even in the configuration in which the terminal body includes Cu and the bonding material includes the solder, solder leaching tends not to occur in the terminal body. As a result, the one aspect reduces a decrease in the mechanical strength of the metal terminal.

In the high frequency range, a skin effect occurs, in which a current tends to flow near the surface of a conductor. Ni is a magnetic material. For example, the skin depth of a conductor including Ni is smaller than the skin depth of a conductor including Cu. The conductor including Ni increases the transmission loss due to the skin effect in the high frequency range as compared with the conductor including Cu.

In the one aspect, in the high frequency range, a current tends to flow near the surface of the metal terminal. The terminal body including Cu is exposed at the side surface of the metal terminal. Ni tends not to be exposed at the side surface. Therefore, the one aspect reduces an increase in the transmission loss due to the skin effect in the high frequency range.

In the one aspect, Cu included in the terminal body may be exposed at the side surface.

The configuration in which Cu is exposed at the side surface certainly reduces an increase in the transmission loss due to the skin effect in the high frequency range.

In the one aspect, the metal terminal may include a plurality of portions opposing the external electrode, connected to the bonding material, and separated from each other. Each of the plurality of portions may include a surface exposed to a space between the plurality of portions. The side surface may include the surface included in each of the plurality of portions.

The configuration in which the metal terminal includes the plurality of portions increases the ratio of the side surface to an outer surface of the metal terminal Therefore, the configuration more certainly reduces an increase in the transmission loss due to the skin effect in the high frequency range.

In the one aspect, the terminal body may have a thickness of 0.05 mm or more.

The configuration in which the terminal body has the above thickness still more certainly reduces an increase in the transmission loss due to the skin effect in the high frequency range.

In the one aspect, the Ni plated layer may have a thickness of 1 to 4 μm.

The configuration in which the Ni plated layer has the above thickness still more certainly reduces an increase in the transmission loss due to the skin effect in the high frequency range.

In the one aspect, the first metal layer may include a Sn plated layer including the first main surface. The second metal layer may include a Sn plated layer including the second main surface.

The configuration in which each of the first and second metal layers includes the Sn plated layer still more certainly reduces an increase in the transmission loss due to the skin effect in the high frequency range.

In the one aspect, the component body may include an internal conductor disposed in the element body and electrically and physically connected to the external electrode. The internal conductor may include a first region physically connected to the external electrode, and a second region continuous with the first region and having a width larger than the width of the first region. The first region may include an end edge that is separated from an end edge of the side surface in a width direction of the first region by a shortest distance of 0.5 to 1 mm.

The configuration in which the first region includes the end edge still more certainly reduces an increase in the transmission loss due to the skin effect in the high frequency range.

In the one aspect, the component body may include an internal conductor disposed in the element body and electrically and physically connected to the external electrode. The internal conductor may include a first region physically connected to the external electrode, and a second region continuous with the first region and having a width larger than the width of the first region. The first region may include an end edge that is separated from an end edge of the terminal body in a width direction of the first region by a shortest distance of 0.34 to 0.88 mm.

The configuration in which the first region includes the end edge still more certainly reduces an increase in the transmission loss due to the skin effect in the high frequency range.

In the one aspect, the component body may include a plurality of internal conductors disposed in the element body and opposing each other. The metal terminal may include a first portion connected to the external electrode and extending in a direction in which the plurality of internal conductors oppose each other, and a second portion extending in a direction intersecting the direction in which the plurality of internal conductors oppose each other.

The configuration in which the metal terminal includes the first and second portions allows the second portion to function as a mounting area to be connected to an electronic device.

In the one aspect, the metal terminal may include a first portion connected to the external electrode and extending in a first direction, and a second portion extending in a second direction intersecting the first direction. The side surface may include a first surface extending in the first direction in the first portion and a second surface continuous with the first surface and extending in the second direction in the second portion.

The configuration in which the side surface includes the first and second surfaces increases the ratio of the side surface to the outer surface of the metal terminal. This configuration further certainly reduces an increase in the transmission loss due to the skin effect in the high frequency range.

The present disclosure will become more fully understood from the detailed description given hereinafter and the accompanying drawings which are given by way of illustration only, and thus are not to be considered as limiting the present disclosure.

Further scope of applicability of the present disclosure will become apparent from the detailed description given hereinafter. However, it should be understood that the detailed description and specific examples, while indicating examples of the disclosure, are given by way of illustration only, since various changes and modifications within the spirit and scope of the disclosure will become apparent to those skilled in the art from this detailed description.

BRIEF DESCRIPTION OF THE DRAWINGS

FIG. 7 is a table illustrating an equivalent series resistance (ESR) of each sample;

FIG. 8 is a table illustrating an ESR and crotch tear strength of each sample;

FIG. 9 is a table illustrating an ESR of each sample; and

FIG. 10 is a table illustrating an ESR of each sample.

DETAILED DESCRIPTION

Figure 1:
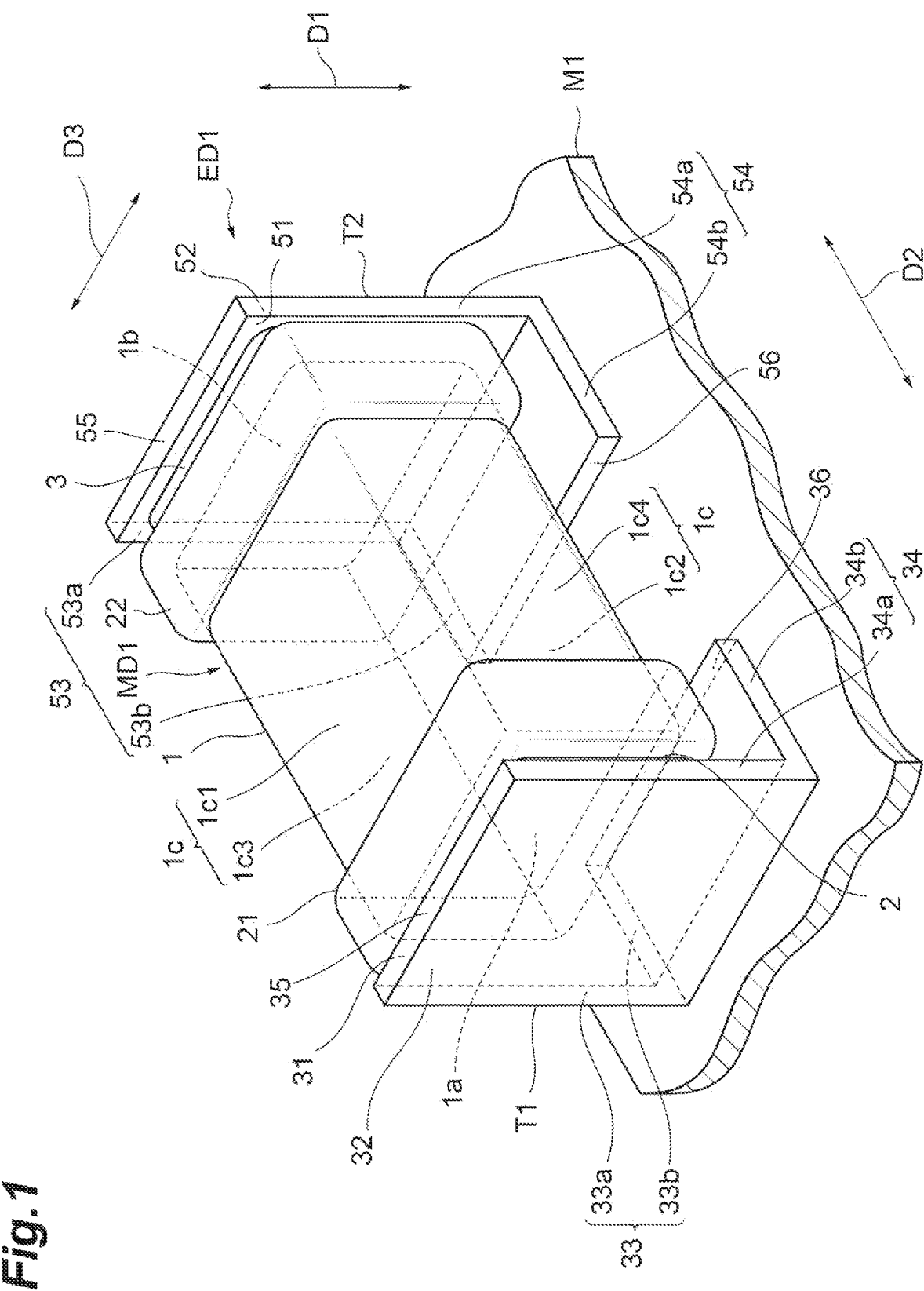
FIG. 1 is a perspective view illustrating an electronic component according to an example.

Hereinafter, examples of the present disclosure will be described in detail with reference to the accompanying drawings. In the following description, the same elements or elements having the same functions are denoted with the same reference numerals and overlapped explanation is omitted.

Figure 2:
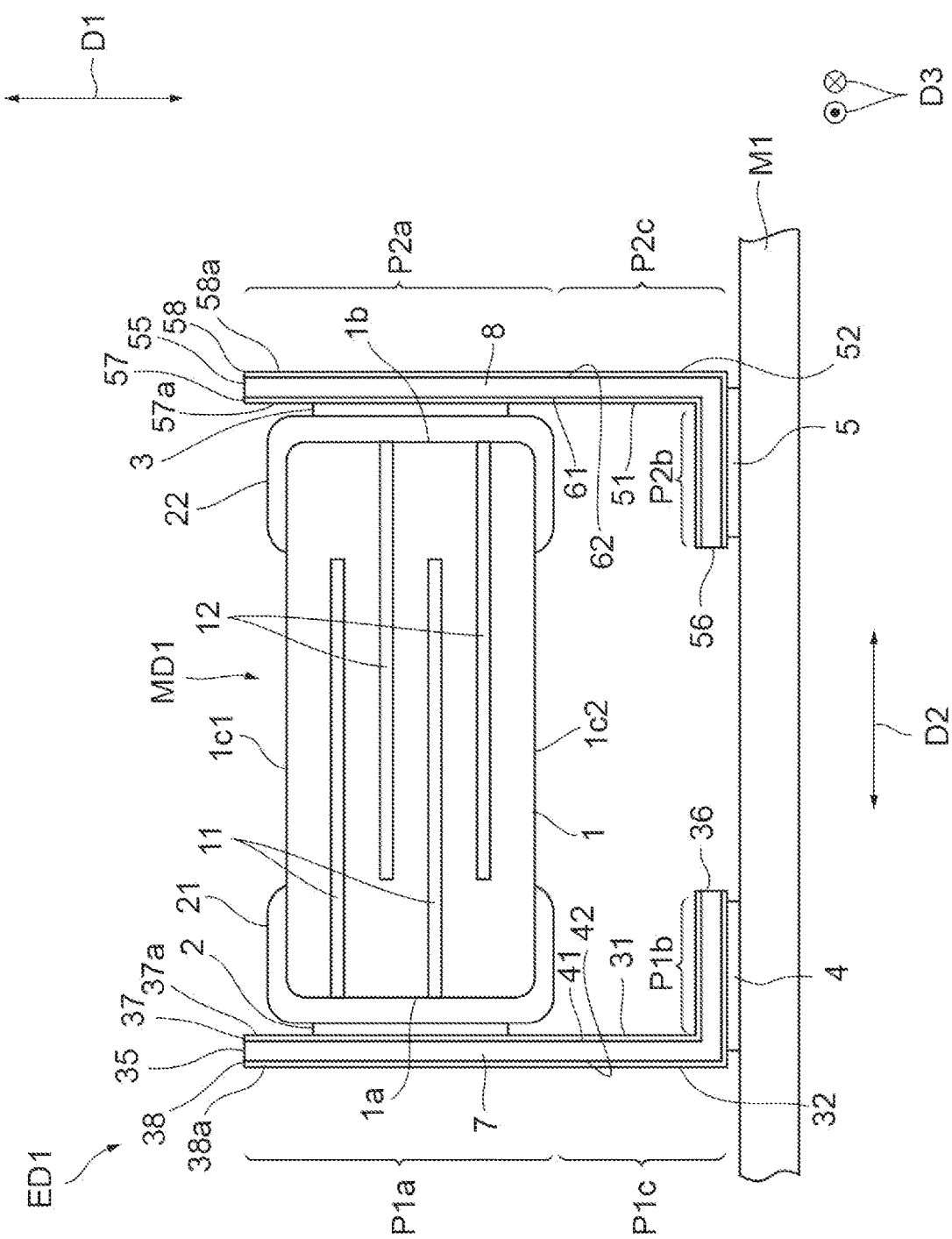
FIG. 2 is a diagram illustrating the cross-sectional configuration of the electronic component according to the present example.
Figure 3:
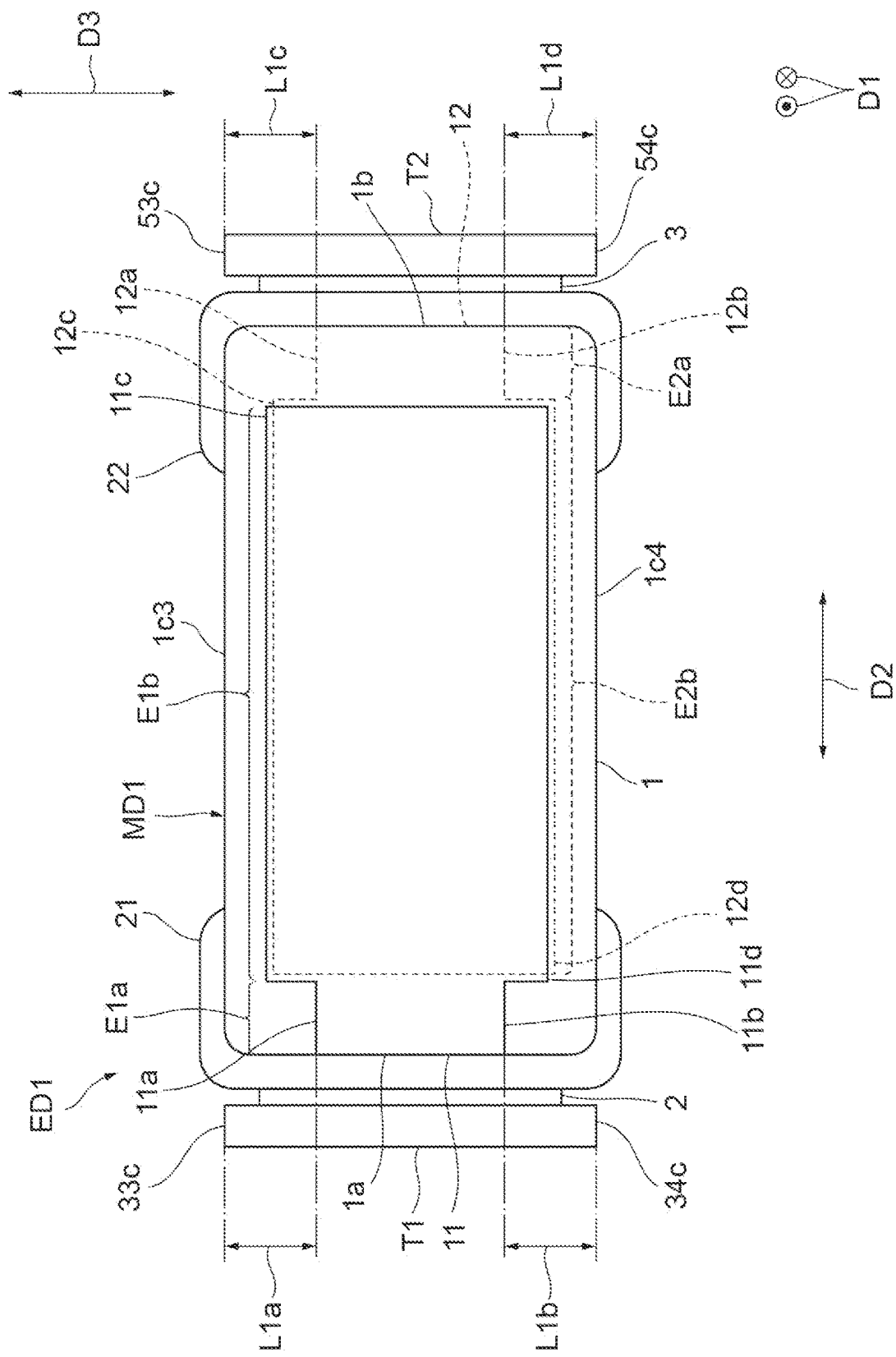
FIG. 3 is a diagram illustrating the cross-sectional configuration of the electronic component according to the present example.

An electronic component according to the present example will be described with reference to FIGS. 1 to 3. FIG. 1 is a perspective view illustrating an electronic component according to the present example. Each of FIG. 2 and FIG. 3 is a diagram illustrating the cross-sectional configuration of the electronic component according to the present example. In the present example, an electronic component ED1 including a multilayer ceramic capacitor will be described.

The electronic component ED1 includes a component body MD1. In the present example, the component body MD1 includes a multilayer capacitor. The multilayer capacitor includes a multilayer ceramic capacitor. The component body MD1 includes an element body 1. The element body 1 includes, for example, a plurality of dielectric layers laminated in a first direction D1. In the present example, the element body 1 has a rectangular parallelepiped shape. An outer surface of the element body 1 includes a pair of end surfaces $1a$ and $1b$ opposing each other and a side surface $1c$ coupling the end surface $1a$ and the end surface $1b$. The side surface $1c$ is adjacent to the end surfaces $1a$ and $1b$. The side surface $1c$ includes a pair of side surfaces $1c1$ and $1c2$ opposing each other and a pair of side surfaces $1c3$ and $1c4$ opposing each other. The end surfaces $1a$ and $1b$, the side surfaces $1c1$ and $1c2$, and the side surfaces $1c3$ and $1c4$ have, for example, a rectangular shape. A "rectangular parallelepiped shape" in the present specification includes a rectangular parallelepiped shape in which corner portions and ridge portions are chamfered, or a rectangular parallelepiped shape in which corner portions and the ridge portions are rounded. A "rectangular shape" in the present specification includes, for example, a shape in which each corner is chamfered or a shape in which each corner is rounded.

The end surfaces $1a$ and $1b$ oppose each other in a second direction D2. The second direction D2 intersects the first direction D1. The end surfaces $1a$ and $1b$ are, for example, orthogonal to the second direction D2. The side surfaces $1c1$ and $1c2$ are adjacent to the end surfaces $1a$ and $1b$ and oppose each other in the first direction D1. The side surfaces $1c1$ and $1c2$ are, for example, orthogonal to the first direction D1. The side surfaces $1c3$ and $1c4$ are adjacent to the end surfaces $1a$ and $1b$ and the side surfaces $1c1$ and $1c2$, and oppose each other in a third direction D3. The third direction D3 intersects the first direction D1 and the second direction D2. The side surfaces $1c3$ and $1c4$ define both ends of the element body 1 in the third direction D3. The side surfaces $1c3$ and $1c4$ are, for example, orthogonal to the third direction D3. In the present example, the first direction D1, the second direction D2, and the third direction D3 are orthogonal to each other.

The end surfaces 1a and 1b extend in the first direction D1 to couple the side surface 1c1 and the side surface 1c2. The end surfaces 1a and 1b extend in the third direction D3 to couple the side surface 1c3 and the side surface 1c4. The side surfaces 1c1 and 1c2 extend in the second direction D2 to couple the end surface 1a and the end surface 1b. The side surfaces 1c1 and 1c2 extend in the third direction D3 to couple the side surface 1c3 and the side surface 1c4. The side surfaces 1c3 and 1c4 extend in the second direction D2 to couple the end surface 1a and the end surface 1b. The side surfaces 1c3 and 1c4 extend in the first direction D1 to couple the side surface 1c1 and the side surface 1c2. The end surfaces 1a and 1b, the side surfaces 1c1 and 1c2, and the side surfaces 1c3 and 1c4 may be indirectly adjacent to each other. In this case, a ridge portion is located between the end surfaces 1a and 1b, the side surfaces 1c1 and 1c2, and the side surfaces 1c3 and 1c4. In FIG. 2, hatching is omitted to clearly illustrate each part.

The length of the element body 1 in the first direction D1 is, for example, 2.0 mm. The length of the element body 1 in the second direction D2 is, for example, 5.7 mm. The length of the element body 1 in the third direction D3 is, for example, 5.0 mm. In the element body 1, for example, the second direction D2 is a long side direction.

In the present example, the element body 1 includes, for example, a plurality of dielectric layers. Each dielectric layer includes a part of the element body 1. Each dielectric layer includes, for example, a ceramic sintered body. The ceramic sintered body includes, for example, a dielectric material. The dielectric material includes, for example, a $BaTiO_3$-based, $Ba(Ti,Zr)O_3$-based, $(Ba,Ca)TiO_3$-based, $CaZrO_3$-based, or $(Ca,Sr)ZrO_3$-based material. In the actual element body 1, the dielectric layers are integrated to such an extent that boundaries between the dielectric layers cannot be visually recognized.

The component body MD1 includes a plurality of internal conductors 11 and 12. In the present example, the component body MD1 includes two internal conductors 11 and two internal conductors 12. The internal conductors 11 and 12 oppose each other. The internal conductors 11 and 12 oppose each other in the first direction D1, for example. In FIG. 3, hatching is omitted to clearly illustrate each part, and, for the sake of explanation, the internal conductors 11 and 12 are intentionally shifted from each other when viewed in the first direction D1.

The internal conductor 11 includes a region E1a and a region E1b continuous with the region E1a. In the present example, the region E1b is continuous with the region E1a in the first direction D1. The region E1a is exposed at the end surface 1a. The region E1a is physically connected to an external electrode 21. The region E1b is not exposed at the end surfaces 1a and 1b and the side surface 1c. The region E1a and the region E1b have, for example, a rectangular shape when viewed in the first direction D1. For example, when the region E1a includes a first region, the region E1b includes a second region.

The region E1a includes a pair of end edges 11a and 11b opposing each other in the third direction D3. The pair of end edges 11a and 11b defines both ends of the region E1a in the third direction D3. The end edge 11a opposes the side surface 1c3. The end edge 11b opposes the side surface 1c4. The region E1b includes a pair of end edges 11c and 11d opposing each other in the third direction D3. The pair of end edges 11c and 11d defines both ends of the region E1b in the third direction D3. The end edge 11c opposes the side surface 1c3. The end edge 11d opposes the side surface 1c4.

The region E1b has, for example, a width larger than the width of the region E1a. In the present example, the width of the region E1a is a distance between the end edge 11a and the end edge 11b in the third direction D3. That is, the width direction of the region E1a is, for example, the third direction D3. The width of the region E1b is a distance between the end edge 11c and the end edge 11d in the third direction D3.

The internal conductor 12 includes a region E2a and a region E2b continuous with the region E2a. In the present example, the region E2b is continuous with the region E2a in the first direction D1. The region E2a is exposed at the end surface 1b. The region E2a is physically connected to an external electrode 22. The region E2b is not exposed at the end surfaces 1a and 1b and the side surface 1c. The region E2a and the region E2b have, for example, a rectangular shape when viewed in the first direction D1. For example, when the region E2a includes a first region, the region E2b includes a second region.

The region E2a includes a pair of end edges 12a and 12b opposing each other in the third direction D3. The pair of end edges 12a and 12b defines both ends of the region E2a in the third direction D3. The end edge 12a opposes the side surface 1c3. The end edge 12b opposes the side surface 1c4. The region E2b includes a pair of end edges 12c and 12d opposing each other in the third direction D3. The pair of end edges 12c and 12d defines both ends of the region E2b in the third direction D3. The end edge 12c opposes the side surface 1c3. The end edge 12d opposes the side surface 1c4.

The region E2b has, for example, a width larger than the width of the region E2a. In the present example, the width of the region E2a is a distance between the end edge 12a and the end edge 12b in the third direction D3. That is, the width direction of the region E2a is, for example, the third direction D3. The width of the region E2b is a distance between the end edge 12c and the end edge 12d in the third direction D3.

The internal conductors 11 and 12 include, for example, a conductive material. The conductive material included in the internal conductors 11 and 12 includes, for example, Ag, Pd, Au, Ni, Pt, or Cu. The conductive material included in the internal conductors 11 and 12 may include, for example, an Ag—Pd alloy, an Ag—Cu alloy, an Ag—Au alloy, or an Ag—Pt alloy. The internal conductors 11 and 12 are configured as, for example, a sintered body of a conductive paste including the conductive material. The internal conductor 11 and the internal conductor 12 are disposed at different positions (layers) in the first direction D1. The internal conductor 11 and the internal conductor 12 are alternately disposed, in the element body 1, to oppose each other in the first direction D1 with an interval therebetween. The polarity of the internal conductor 11 and the polarity of the internal conductor 12 are different from each other, for example. The thickness of each of the internal conductors 11 and 12 is, for example, 0.3 to 3.0 μm.

The component body MD1 includes external electrodes 21 and 22. The external electrodes 21 and 22 are disposed on the element body 1. The external electrodes 21 and 22 oppose each other in the second direction D2 with the element body 1 interposed therebetween.

The external electrode 21 is disposed on the end surface 1a. The external electrode 21 is disposed to cover the end surface 1a. The external electrode 21 is also disposed on a partial surface of the side surface 1c. The external electrode 21 covers corner portions formed of the end surface 1a and the side surface 1c, and ridge portions connecting the corner portions to each other. The external electrode 21 is physically connected to the region E1a of the internal conductor 11 on the end surface 1a.

The external electrode 22 is disposed on the end surface 1b. The external electrode 22 is disposed to cover the end surface 1b. The external electrode 22 is also disposed on a partial surface of the side surface 1c. The external electrode 22 covers corner portions formed of the end surface 1b and the side surface 1c, and ridge portions connecting the corner portions to each other. The external electrode 22 is physically connected to the region E2a of the internal conductor 12 on the end surface 1b.

The external electrodes 21 and 22 include, for example, a sintered conductor layer. The sintered conductor layer is formed, for example, through sintering a conductive paste applied to the outer surface of the element body 1. The conductive paste may include a conductive metal powder and a glass frit. The conductive paste includes, for example, a glass component, an organic binder, and an organic solvent. When the conductive paste is sintered in a reducing atmosphere, the metal powder included in the conductive paste may be oxidized. The external electrodes 21 and 22 may include a plated layer formed on the sintered conductor layer. The plated layer includes, for example, a Ni plated layer and a Sn plated layer. In the present example, the Ni plated layer is formed on the sintered conductor layer, and the Sn plated layer is formed on the Ni plated layer.

The electronic component ED1 includes a metal terminal T1. The metal terminal T1 includes main surfaces 31 and 32 and side surfaces 33 and 34. The main surface 31 is closer to the component body MD1 than the main surface 32. The side surfaces 33 and 34 couple the main surface 31 and the main surface 32. The side surfaces 33 and 34 oppose each other in the third direction D3. A distance between the side surface 33 and the side surface 34 defines the length of the metal terminal T1 in the third direction D3. The side surface 33 and the side surface 34 define both ends of the metal terminal T1 in the third direction D3. For example, when the main surface 31 includes a first main surface, the main surface 32 includes a second main surface.

The metal terminal T1 includes a portion P1a and a portion P1b. The portion P1a is connected to the external electrode 21 and extends in the first direction D1. The portion P1b extends in the second direction D2. The metal terminal T1 includes a portion P1c connecting the portion P1a and the portion P1b. The portion P1c extends, for example, in the first direction D1. The portion P1c is integrated with the portion P1a on the same plane, for example. The integrated portion P1a and portion P1c have a rectangular shape when viewed in the second direction D2. The portion P1a and the portion P1c are separated from each other by the length of the portion P1c when viewed in the first direction D1. The portion P1a, the portion P1c, and the portion P1b are integrally formed, for example. In the present example, an extending direction of the metal terminal T1 intersects at the boundary between the portion P1c and the portion P1b. The portion P1c and the portion P1b are, for example, orthogonal to each other. For example, when the portion P1a includes the first portion, the portion P1b includes the second portion.

The metal terminal T1 includes an upper surface 35 and a lower surface 36. The upper surface 35 is located at the end edge of the portion P1a in the first direction D1. The upper surface 35 extends in the third direction D3 to couple the side surface 33 and the side surface 34. The lower surface 36 is located at the end edge of the portion P1b in the second direction D2. The lower surface 36 extends in the third direction D3 to couple the side surface 33 and the side surface 34.

The electronic component ED1 includes bonding materials 2 and 4. The portion P1a opposes the external electrode 21 and is connected to the external electrode 21 through the bonding material 2. The portion P1a extends in the second direction D2 and the third direction D3. The portion P1b is connected to an electronic device M1 through the bonding material 4. The portion P1b functions as a mounting area to be connected to the electronic device M1.

The bonding material 2 is disposed in the portion P1a. When viewed in the second direction D2, the outermost peripheral edge of the bonding material 2 is located inside the outermost edge of the portion P1a and is separated from the outermost edge of the portion P1a. When viewed in the second direction D2, the outermost peripheral edge of the bonding material 2 is located inside the side surfaces 33 and 34 and the upper surface 35, and is separated from the side surfaces 33 and 34 and the upper surface 35. The bonding material 4 is disposed in the portion P1b. When viewed in the first direction D1, the outermost peripheral edge of the bonding material 4 is located inside the outermost edge of the portion P1b and is separated from the outermost edge of the portion P1b. When viewed in the first direction D1, the outermost peripheral edge of the bonding material 4 is located inside the side surfaces 33 and 34 and the lower surface 36 and is separated from the side surfaces 33 and 34 and the lower surface 36.

The metal terminal T1 includes a terminal body 7. The terminal body 7 includes opposing surfaces 41 and 42 opposing each other and side surfaces 33 and 34. The opposing surface 41 is closer to the component body MD1 than the opposing surface 42. The opposing surfaces 41 and 42 and the side surfaces 33 and 34 extend from the portion P1a to the portion P1b. The side surfaces 33 and 34 couple the opposing surface 41 and the opposing surface 42. The side surface 33 of the terminal body 7 coincides with the side surface 33 of the metal terminal T1. The side surface 34 of the terminal body 7 coincides with the side surface 34 of the metal terminal T1.

The terminal body 7 is exposed at the side surfaces 33 and 34 of the metal terminal T1. The side surface 33 includes a surface 33a and a surface 33b. The side surface 34 includes a surface 34a and a surface 34b. The surface 33a extends in the first direction D1 in the portion P1a. The surface 33b is continuous with the surface 33a and extends in the second direction D2 in the portion P1b. The surface 34a extends in the first direction D1 in the portion P1a. The surface 34b is continuous with the surface 34a and extends in the second direction D2 in the portion P1b.

The terminal body 7 includes a metal material. The metal material included in the terminal body 7 includes Cu. The terminal body 7 has a thickness of, for example, 0.05 mm or more. For example, when each of the surfaces 33a and 34a includes a first surface, each of the surfaces 33b and 34b includes a second surface.

The metal terminal T1 includes a metal layer 37 and a metal layer 38. Each of the metal layers 37 and 38 includes a Ni plated layer. The Ni plated layer has a thickness of, for example, 1 to 4 μm. The metal layer 37 includes a main surface 31. The metal layer 37 is disposed on the opposing surface 41. The metal layer 37 extends from the portion P1a to the portion P1b. The metal layer 38 includes a main surface 32. The metal layer 38 is disposed on the opposing surface 42. The metal layer 38 extends from the portion P1a to the portion P1b. In the present example, none of the metal layers 37 and 38 is disposed on the side surfaces 33 and 34. Cu is exposed at the side surfaces 33 and 34. Cu exposed at the side surfaces 33 and 34 is included in the terminal body 7. The side surfaces 33 and 34 include Cu included in the terminal body 7. The metal layer 37 located on the portion P1a is connected to the bonding material 2. The metal layer 38 located on the portion P1b is connected to the bonding material 4. For example, when the metal layer 37 includes a first metal layer, the metal layer 38 includes a second metal layer.

The terminal body 7 includes an upper surface 35 and a lower surface 36. In the present example, the upper surface 35 of the terminal body 7 coincides with the upper surface 35 of the metal terminal T1. The lower surface 36 of the terminal body 7 coincides with the lower surface 36 of the metal terminal T1. In the present example, Cu is exposed, for example, at the upper surface 35 and the lower surface 36. Cu exposed at the upper surface 35 and the lower surface 36 is included in the terminal body 7. A metal layer may be formed on the upper surface 35 and the lower surface 36. In this case, the metal layer formed on each of the upper surface 35 and the lower surface 36 includes, for example, a Ni plated layer. The metal layer may be formed only on one of the upper surface 35 and the lower surface 36.

The metal layer 37 includes, for example, a Sn plated layer including the main surface 31. The metal layer 38 includes, for example, a Sn plated layer including the main surface 32. In the present example, the metal layer 37 includes an outermost layer 37a. The outermost layer 37a includes Sn. The metal layer 38 includes an outermost layer 38a. The outermost layer 38a includes Sn. Each of the metal layer 37 and the metal layer 38 may include a plurality of layers. In this case, the outermost layer, among the plurality of layers included in each of the metal layer 37 and the metal layer 38, includes Sn. In the metal layer 37 and the metal layer 38, another layer may be located below the layer including Sn. A layer having an electrical conductivity different from the electrical conductivity of the metal layer 37 and the metal layer 38 may be disposed between each of the metal layer 37 and the metal layer 38 and the terminal body 7. In the present example, a plating method is used as a method for forming a plated layer. The plating method includes, for example, a sputtering method, a vapor deposition method, or an electrolytic plating method.

The electronic component ED1 includes a metal terminal T2. The metal terminal T2 includes main surfaces 51 and 52 and side surfaces 53 and 54. The main surface 51 is closer to the component body MD1 than the main surface 52. The side surfaces 53 and 54 couple the main surface 51 and the main surface 52. The side surfaces 53 and 54 oppose each other in the third direction D3. A distance between the side surface 53 and the side surface 54 defines the length of the metal terminal T2 in the third direction D3. The side surface 53 and the side surface 54 define both ends of the metal terminal T2 in the third direction D3. For example, when the main surface 51 includes a first main surface, the main surface 52 includes a second main surface.

The metal terminal T2 includes a portion P2a and a portion P2b. The portion P2a is connected to the external electrode 22 and extends in the first direction D1. The portion P2b extends in the second direction D2. The metal terminal T2 includes a portion P2c connecting the portion P2a and the portion P2b. The portion P2c extends, for example, in the first direction D1. The portion P2c is integrated with the portion P2a on the same plane, for example. The integrated portion P2a and portion P2c have a rectangular shape when viewed in the second direction D2. The portion P2a and the portion P2c are separated from each other by the length of the portion P2c when viewed in the first direction D1. The portion P2a, the portion P2c, and the portion P2b are integrally formed, for example. In the present example, an extending direction of the metal terminal T2 intersects at the boundary between the portion P2c and the portion P2b. The portion P2c and the portion P2b are, for example, orthogonal to each other. For example, when the portion P2a includes a first portion, the portion P2b includes a second portion.

The metal terminal T2 includes an upper surface 55 and a lower surface 56. The upper surface 55 is located at the end edge of the portion P2a in the first direction D1. The upper surface 55 extends in the third direction D3 to couple the side surface 53 and the side surface 54. The lower surface 56 is located at the end edge of the portion P2b in the second direction D2. The lower surface 56 extends in the third direction D3 to couple the side surface 53 and the side surface 54.

The electronic component ED1 includes bonding materials 3 and 5. The portion P2a opposes the external electrode 22 and is connected to the external electrode 22 through the bonding material 3. The portion P2a extends in the second direction D2 and the third direction D3. The portion P2b is connected to an electronic device M1 through the bonding material 5. The portion P2b functions as a mounting area to be connected to the electronic device M1. The portion P2b is located on substantially the same plane as the portion P1b.

The bonding material 3 is disposed in the portion P2a. When viewed in the second direction D2, the outermost peripheral edge of the bonding material 3 is located inside the outermost edge of the portion P2a and is separated from the outermost edge of the portion P2a. When viewed in the second direction D2, the outermost peripheral edge of the bonding material 3 is located inside the side surfaces 53 and 54 and the upper surface 55, and is separated from the side surfaces 53 and 54 and the upper surface 55. The bonding material 5 is disposed in the portion P2b. When viewed in the first direction D1, the outermost peripheral edge of the bonding material 5 is located inside the outermost edge of the portion P2b and is separated from the outermost edge of the portion P2b. When viewed in the first direction D1, the outermost peripheral edge of the bonding material 5 is located inside the side surfaces 53 and 54 and the lower surface 56 and is separated from the side surfaces 53 and 54 and the lower surface 56.

The metal terminal T2 includes a terminal body 8. The terminal body 8 includes opposing surfaces 61 and 62 opposing each other and side surfaces 53 and 54. The opposing surface 61 is closer to the component body MD1 than the opposing surface 62. The opposing surfaces 61 and 62 and the side surfaces 53 and 54 extend from the portion P2a to the portion P2b. The side surfaces 53 and 54 couple the opposing surface 61 and the opposing surface 62. The side surface 53 of the terminal body 8 coincides with the side surface 53 of the metal terminal T2. The side surface 54 of the terminal body 8 coincides with the side surface 54 of the metal terminal T2.

The terminal body 8 is exposed at the side surfaces 53 and 54 of the metal terminal T2. The side surface 53 includes a surface 53a and a surface 53b. The side surface 54 includes a surface 54a and a surface 54b. The surface 53a extends in the first direction D1 in the portion P2a. The surface 53b is continuous with the surface 53a and extends in the second direction D2 in the portion P2b. The surface 54a extends in the first direction D1 in the portion P2a. The surface 54b is continuous with the surface 54a and extends in the second direction D2 in the portion P2b.

The terminal body 8 includes a metal material. The metal material included in the terminal body 8 includes Cu. The terminal body 8 has a thickness of, for example, 0.05 mm or more. For example, when each of the surfaces 53a and 54a includes a first surface, each of the surfaces 53b and 54b includes a second surface.

The metal terminal T2 includes a metal layer 57 and a metal layer 58. Each of the metal layers 57 and 58 includes a Ni plated layer. The Ni plated layer has a thickness of, for example, 1 to 4 µm. The metal layer 57 includes a main surface 51. The metal layer 57 is disposed on the opposing surface 61. The metal layer 57 extends from the portion P2a to the portion P2b. The metal layer 58 includes a main surface 52. The metal layer 58 is disposed on the opposing surface 62. The metal layer 58 extends from the portion P2a to the portion P2b. In the present example, none of the metal layers 57 and 58 is disposed on the side surfaces 53 and 54. Cu is exposed at the side surfaces 53 and 54. Cu exposed at the side surfaces 53 and 54 is included in the terminal body 8. The side surfaces 53 and 54 include Cu included in the terminal body 8. The metal layer 57 located on the portion P2a is connected to the bonding material 3. The metal layer 58 located on the portion P2b is connected to the bonding material 5. For example, when the metal layer 57 includes a first metal layer, the metal layer 58 includes a second metal layer.

The terminal body 8 includes an upper surface 55 and a lower surface 56. In the present example, the upper surface 55 of the terminal body 8 coincides with the upper surface 55 of the metal terminal T2. The lower surface 56 of the terminal body 8 coincides with the lower surface 56 of the metal terminal T2. In the present example, Cu is exposed, for example, at the upper surface 55 and the lower surface 56. Cu exposed at the upper surface 55 and the lower surface 56 is included in the terminal body 8. A metal layer may be formed on the upper surface 55 and the lower surface 56. In this case, the metal layer formed on each of the upper surface 55 and the lower surface 56 includes, for example, a Ni plated layer. The metal layer may be formed only on one of the upper surface 55 and the lower surface 56.

The metal layer 57 includes, for example, a Sn plated layer including the main surface 51. The metal layer 58 includes, for example, a Sn plated layer including the main surface 52. In the present example, the metal layer 57 includes an outermost layer 57a. The outermost layer 57a includes Sn. The metal layer 58 includes an outermost layer 58a. The outermost layer 58a includes Sn. Each of the metal layer 57 and the metal layer 58 may include a plurality of layers. In this case, the outermost layer, among the plurality of layers included in each of the metal layer 57 and the metal layer 58, includes Sn. In the metal layer 57 and the metal layer 58, another layer may be located below the layer including Sn. A layer having an electrical conductivity different from the electrical conductivity of the metal layer 57 and the metal layer 58 may be disposed between each of the metal layer 57 and the metal layer 58 and the terminal body 8.

In the present example, the bonding materials 2 and 3 include solder. The bonding material 2 is disposed between the external electrode 21 and the main surface 31, and electrically and physically connects the external electrode 21 and the metal terminal T1. The bonding material 3 is disposed between the external electrode 22 and the main surface 51, and electrically and physically connects the external electrode 22 and the metal terminal T2. The electronic component ED1 may include bonding materials 4 and 5 that connect the electronic component ED1 to the electronic device M1. The bonding materials 4 and 5 include, for example, solder. In the present example, the electronic device M1 includes, for example, a circuit board or other electronic component.

The solder of the bonding materials 2 and 3 is formed through, for example, reflow soldering. In the present example, a solder paste is applied to predetermined positions on surfaces connected to each other with, for example, a dispenser. The solder included in the bonding materials 2 and 3 includes, for example, a Sn—Sb solder or a Pb—Sn solder. The solder of the bonding materials 4 and 5 is formed through, for example, reflow soldering. In the present example, the solder paste is applied to predetermined positions on surfaces connected to each other through, for example, a printing method. The solder included in the bonding materials 4 and 5 includes, for example, a Sn—Ag—Cu solder or a Sn—Cu solder. The solder paste includes, for example, a flux. For example, rosin is used as the flux. The solder paste may include a solvent.

A positional relationship between the internal conductor 11 and the metal terminal T1 will be described with reference to FIG. 3. When viewed in the first direction D1, both ends of the metal terminal T1 in the third direction D3 are defined by an end edge 33c and an end edge 34c. The end edge 33c is located on the outermost side of the metal terminal T1 in the third direction D3 on the side surface 33. The end edge 34c is located on the outermost side of the metal terminal T1 in the third direction D3 on the side surface 34.

In the present example, the end edge 11a is located closer to the end edge 33c than the end edge 11b. The end edge 11a and the end edge 33c form a shortest distance L1a between each of the end edges 11a and 11b and the end edge 33c in the third direction D3. The end edge 11b is located closer to the end edge 34c than the end edge 11a. The end edge 11b and the end edge 34c form a shortest distance L1b between each of the end edges 11a and 11b and the end edge 34c in the third direction D3. The shortest distance L1a and the shortest distance L1b may be equal to each other or may be different from each other. The shortest distances L1a and L1b are, for example, 0.5 to 1 mm.

The shortest distances L1a and L1b are obtained, for example, through the following process.

For example, the cross-sectional photograph of the electronic component ED1 at a position including the regions E1a and E1b is acquired. The cross-sectional photograph includes a photograph of the cross section of the electronic component ED1 cut along a plane orthogonal to the side surfaces 1c1 and 1c2. The acquired cross-sectional photograph is subjected to image processing using software. On the basis of the result of the image processing, the boundary between the end edge 11a and the end edge 33c is determined to estimate the shortest distance L1a, and the boundary between the end edge 11b and the end edge 34c is determined to estimate the shortest distance L1b.

Next, a positional relationship between the internal conductor 12 and the metal terminal T2 will be described. When viewed in the first direction D1, both ends of the metal terminal T1 in the third direction D3 are defined by an end edge 53c and an end edge 54c. The end edge 53c is located on the outermost side of the metal terminal T2 in the third direction D3 on the side surface 53. The end edge 54c is located on the outermost side of the metal terminal T2 in the third direction D3 on the side surface 54.

In the present example, the end edge 12*a* is located closer to the end edge 53*c* than the end edge 12*b*. The end edge 12*a* and the end edge 53*c* give a shortest distance L1*c* between each of the end edges 12*a* and 12*b* and the end edge 53*c* in the third direction D3. The end edge 12*b* is located closer to the end edge 54*c* than the end edge 12*a*. The end edge 12*b* and the end edge 54*c* give a shortest distance L1*d* between each of the end edges 12*a* and 12*b* and the end edge 54*c* in the third direction D3. The shortest distance L1*c* and the shortest distance L1*d* may be equal to each other or may be different from each other. The shortest distances L1*c* and L1*d* are, for example, 0.5 to 1 mm.

In order to obtain the shortest distances L1*c* and L1*d*, for example, the cross-sectional photograph of the electronic component ED1 at a position including the regions E2*a* and E2*b* is acquired. The cross-sectional photograph is a photograph of the cross section of the electronic component ED1 cut along a plane orthogonal to the side surfaces 1*c*1 and 1*c*2. The acquired cross-sectional photograph is subjected to image processing using software. On the basis of the result of the image processing, the boundary between the end edge 12*a* and the end edge 53*c* is determined to estimate the shortest distance L1*c*, and the boundary between the end edge 12*b* and the end edge 54*c* is determined to estimate the shortest distance L1*d*.

In the present example, the shortest distance L1*a* and the shortest distance L1*c* may be equal to each other or may be different from each other. The shortest distance L1*a* and the shortest distance L1*d* may be equal to each other or may be different from each other. The shortest distance L1*b* and the shortest distance L1*c* may be equal to each other or may be different from each other. The shortest distance L1*b* and the shortest distance L1*d* may be equal to each other or may be different from each other. The shortest distances L1*a*, L1*b*, L1*c*, and L1*d* may be equal to each other or may be different from each other.

Figure 4:
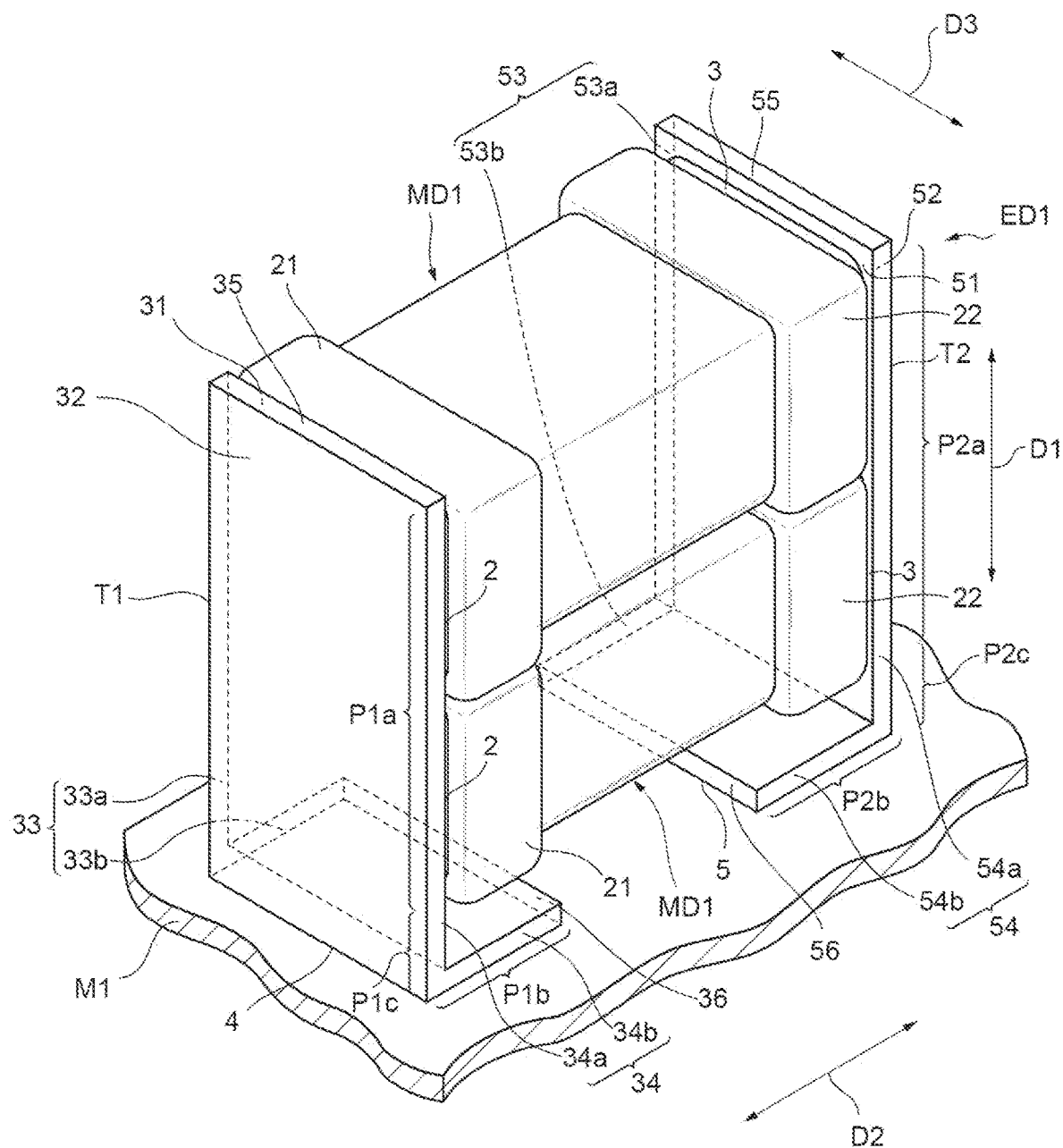
FIG. 4 is a perspective view illustrating an electronic component according to a first modification of the present example.

The configuration of an electronic component ED1 according to a first modification of the present example will be described with reference to FIG. 4. FIG. 4 is a perspective view of an electronic component ED1 according to a first modification of the present example. In the present modification, two electronic component main bodies MD1 are disposed in the first direction D1. In the metal terminals T1 and T2 according to the first modification, in order to connect the two electronic component main bodies MD1, the length of the portion P1*a* in the first direction D1 is larger than the length of the portion P1*a* according to the present example in the first direction D1. Each of the two electronic component main bodies MD1 is connected to the metal terminal T1 through the bonding material 2, and is connected to the metal terminal T2 through the bonding material 3.

The metal terminal T1 according to the first modification includes the same configuration as the configuration of the metal terminal T1 according to the present example except that the length of the portion P1*a* in the first direction D1 is different. The metal terminal T2 according to the first modification includes the same configuration as the configuration of the metal terminal T2 according to the present example except that the length of the portion P2*a* in the first direction D1 is different. The metal terminal T1 and the metal terminal T2 according to the first modification include, for example, the same configuration. The material of the metal terminals T1 and T2 according to the first modification is, for example, the same as the material of the metal terminals T1 and T2 according to the present example.

The metal terminal T1 includes main surfaces 31 and 32 and side surfaces 33 and 34. The side surfaces 33 and 34 extend from the portion P1*a* to the portion P1*b*. For example, Cu is exposed at the side surfaces 33 and 34, and the upper surface 35 and the lower surface 36. A metal layer may be formed on the upper surface 35 and the lower surface 36. The metal terminal T2 includes main surfaces 51 and 52 and side surfaces 53 and 54. The side surfaces 53 and 54 extend from the portion P2*a* to the portion P2*b*. For example, Cu is exposed at the side surfaces 53 and 54, and the upper surface 55 and the lower surface 56. A metal layer may be formed on the upper surface 55 and the lower surface 56.

Figure 5:
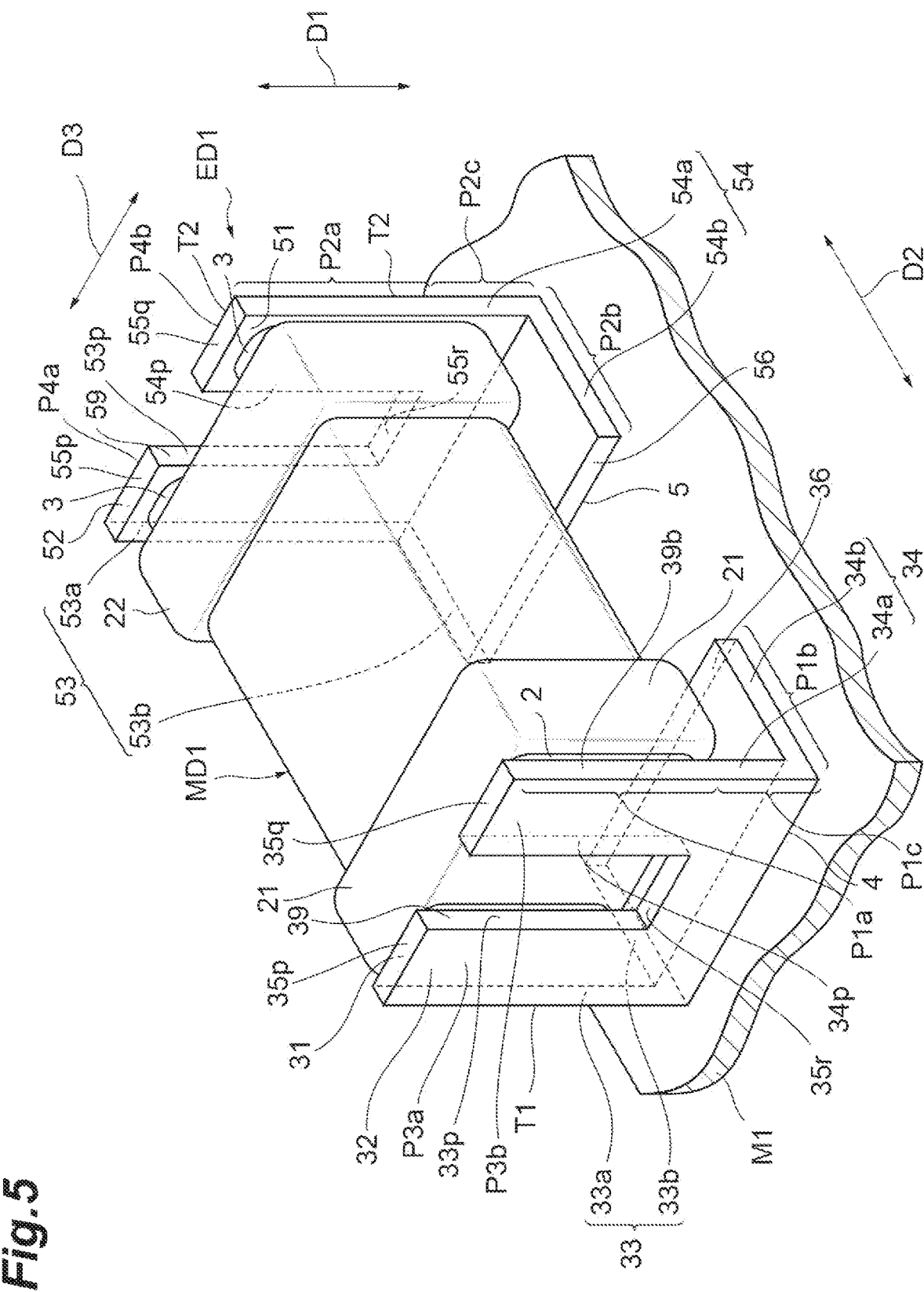
FIG. 5 is a perspective view illustrating an electronic component according to a second modification of the present example.
Figure 6:
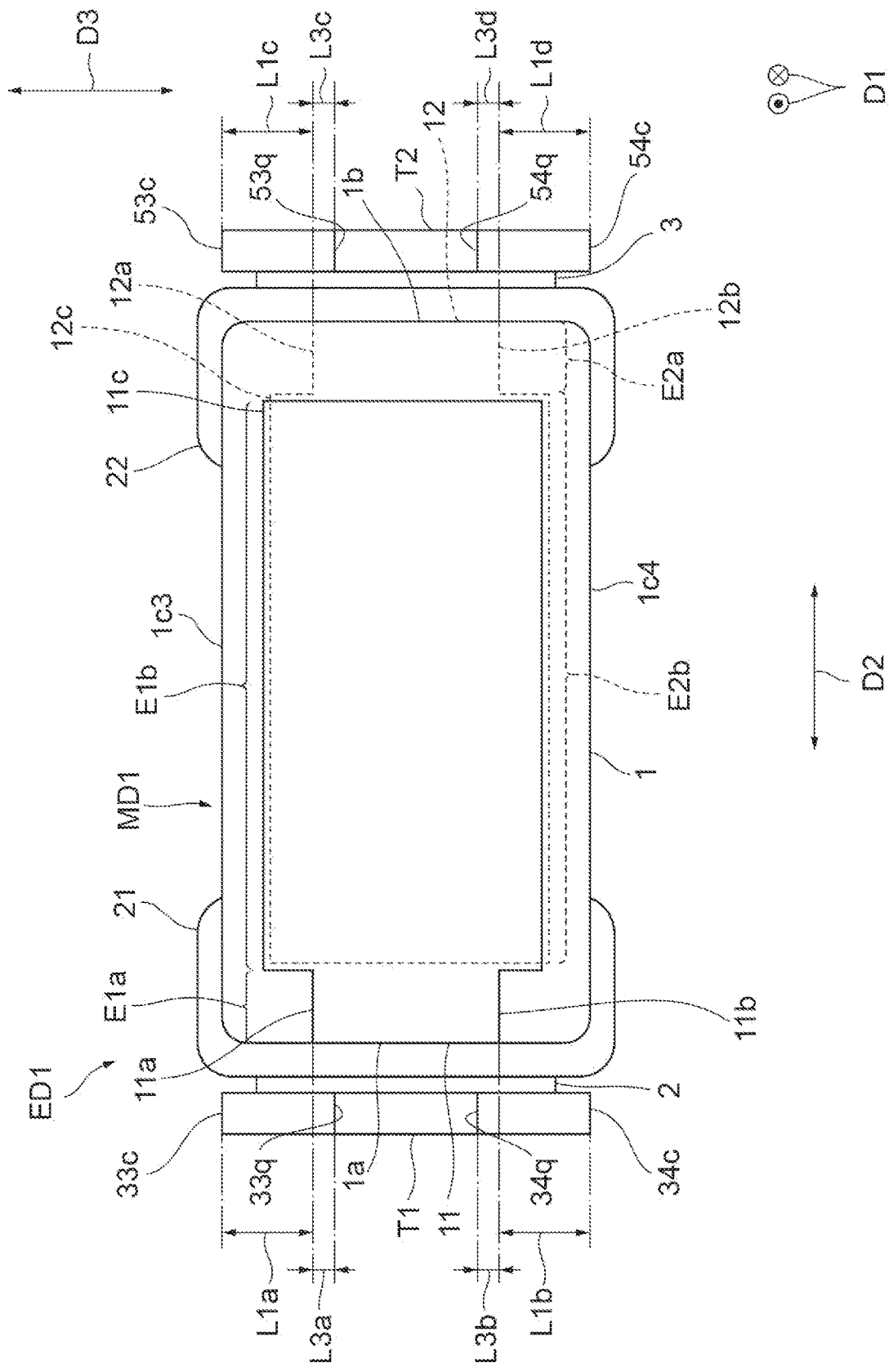
FIG. 6 is a diagram illustrating the cross-sectional configuration of the electronic component according to the second modification of the present example.

The configuration of an electronic component ED1 according to a second modification of the present example will be described with reference to FIGS. 5 and 6. FIG. 5 is a perspective view of an electronic component according to a second modification of the present example. FIG. 6 is a diagram illustrating the cross-sectional configuration of the electronic component according to the second modification of the present example.

In the second modification, the shape of the metal terminal T1 is different from the shape of the metal terminal T1 of the present example. A recess 39 is formed in the metal terminal T1. The metal terminal T1 according to the second modification includes the same configuration as the configuration of the metal terminal T1 according to the present example except that the recess 39 is formed. The metal terminal T1 and the metal terminal T2 according to the second modification include, for example, the same configuration. The material of the metal terminals T1 and T2 according to the second modification is, for example, the same as the material of the metal terminals T1 and T2 according to the present example.

The metal terminal T1 includes a plurality of portions P3*a* and P3*b*. The portions P3*a* and P3*b* are formed in the portion P1*a*. The portions P3*a* and P3*b* are separated from each other in the third direction D3 due to the recess 39. The portions P3*a* and P3*b* oppose each other in the third direction D3 with the recess 39 interposed therebetween. The portion P3*a*, the recess 39, and the portion P3*b* are disposed in the third direction D3 in the order of the portion P3*a*, the recess 39, and the portion P3*b*. In FIG. 6, hatching is omitted to clearly illustrate each part, and, for the sake of explanation, a plurality of internal conductors are intentionally shifted from each other when viewed in the first direction D1.

The metal terminal T1 includes main surfaces 31 and 32 and side surfaces 33 and 34. The side surfaces 33 and 34 couple the main surface 31 and the main surface 32. The side surfaces 33 and 34 oppose each other in the third direction D3. The metal terminal T1 includes a pair of upper surfaces 35*p* and 35*q* and a lower surface 36. In the second modification, the metal terminal T1 includes side surfaces 33*p* and 34*p* and a surface 35*r* that define the recess 39. The side surface 33*p* is included in the portion P3*a*. The side surface 34*p* is included in the portion P3*b*. The surface 35*r* is exposed to a space between the portion P3*a* and the portion P3*b*.

The pair of upper surfaces 35*p* and 35*q* is located at the end edge of the portion P1*a* in the first direction D1. The upper surface 35*p* extends in the third direction D3 to couple the side surface 33 and the side surface 33*p*. The upper surface 35*q* extends in the third direction D3 to couple the side surface 34 and the side surface 34*p*. The side surface 33*p* and the side surface 34*p* oppose each other in the third direction D3 with the recess 39 interposed therebetween. The side surface 33*p* extends in the first direction D1 to couple the upper surface 35*p* and the surface 35*r*. The side surface 34p extends in the first direction D1 to couple the upper surface 35q and the surface 35r to each other. The surface 35r extends in the third direction D3 to couple the side surface 33p and the side surface 34p. The surface 35r defines the deepest portion of the recess 39. The lower surface 36 is located at the end edge of the portion P1b in the second direction D2. The lower surface 36 extends in the third direction D3 to couple the side surface 33 and the side surface 34. The side surface 33, the upper surface 35p, and the side surface 33p define the outer periphery of the portion P3a. The side surface 34, the upper surface 35q, and the side surface 34p define the outer periphery of the portion P3b.

The electronic component ED1 according to the second modification includes two bonding materials 2. Each of the bonding materials 2 includes solder. One bonding material 2 is disposed in the portion P3a. The portion P3a is connected to the external electrode 21 through the one bonding material 2. The portion P3a opposes the external electrode 21 through the one bonding material 2 interposed therebetween. When viewed in the second direction D2, the outermost peripheral edge of the one bonding material 2 is located inside the outermost edge of the portion P3a and is separated from the outermost edge of the portion P3a. When viewed in the second direction D2, the outermost peripheral edge of the one bonding material 2 is located inside the side surface 33, the upper surface 35p, and the side surface 33p, and is separated from the side surface 33, the upper surface 35p, and the side surface 33p.

Other bonding material 2 is disposed in the portion P3b. The portion P3b is connected to the external electrode 21 through the other bonding material 2. The portion P3b opposes the external electrode 21 with the other bonding material 2 interposed therebetween. When viewed in the second direction D2, the outermost peripheral edge of the other bonding material 2 is located inside the outermost edge of the portion P3b and is separated from the outermost edge of the portion P3b. When viewed in the second direction D2, the outermost peripheral edge of the other bonding material 2 is located inside the side surface 34, the upper surface 35q, and the side surface 34p, and is separated from the side surface 34, the upper surface 35p, and the side surface 34p.

The electronic component ED1 according to the second modification includes a bonding material 4. The portion P1b is connected to an electronic device M1 through a bonding material 4.

The metal terminal T2 includes a plurality of portions P4a and P4b. The portions P4a and P4b are formed in the portion P2a. The portions P4a and P4b are separated from each other in the third direction D3 due to the recess 59. The portions P4a and P4b oppose each other in the third direction D3 with the recess 59 interposed therebetween. The portion P4a, the recess 59, and the portion P4b are disposed in the third direction D3 in the order of the portion P4a, the recess 59, and the portion P4b.

The metal terminal T2 includes main surfaces 51 and 52 and side surfaces 53 and 54. The side surfaces 53 and 54 couple the main surface 51 and the main surface 52. The side surfaces 53 and 54 oppose each other in the third direction D3. The metal terminal T1 includes a pair of upper surfaces 55p and 55q and a lower surface 56. In the second modification, the metal terminal T2 includes side surfaces 53p and 54p and a surface 55r that define the recess 59. The side surface 53p is included in the portion P4a. The side surface 54p is included in the portion P4b. The surface 55r is exposed to a space between the portion P4a and the portion P4b.

The pair of upper surfaces 55p and 55q is located at the end edge of the portion P2a in the first direction D1. The upper surface 55p extends in the third direction D3 to couple the side surface 53 and the side surface 53p. The upper surface 55q extends in the third direction D3 to couple the side surface 54 and the side surface 54p. The side surface 53p and the side surface 54p oppose each other in the third direction D3 with the recess 59 interposed therebetween. The side surface 53p extends in the first direction D1 to couple the upper surface 55p and the surface 55r. The side surface 54p extends in the first direction D1 to couple the upper surface 55q and the surface 55r to each other. The surface 55r extends in the third direction D3 to couple the side surface 53p and the side surface 54p. The surface 55r defines the deepest portion of the recess 59. The lower surface 56 is located at the end edge of the portion P2b in the second direction D2. The lower surface 56 extends in the third direction D3 to couple the side surface 53 and the side surface 54. The side surface 53, the upper surface 55p, and the side surface 53p define the outer periphery of the portion P4a. The side surface 54, the upper surface 55q, and the side surface 54p define the outer periphery of the portion P4a.

The electronic component ED1 according to the second modification includes two bonding materials 3. Each of the bonding materials 3 includes solder. One bonding material 3 is disposed in the portion P4a. The portion P4a is connected to the external electrode 22 through the one bonding material 3. The portion P4a opposes the external electrode 22 through the one bonding material 3 interposed therebetween. When viewed in the second direction D2, the outermost peripheral edge of the one bonding material 3 is located inside the outermost edge of the portion P4a and is separated from the outermost edge of the portion P4a. When viewed in the second direction D2, the outermost peripheral edge of the one bonding material 3 is located inside the side surface 53, the upper surface 55p, and the side surface 53p, and is separated from the side surface 53, the upper surface 55p, and the side surface 53p.

The other bonding material 3 is disposed in the portion P4b. The portion P4b is connected to the external electrode 22 through the other bonding material 3. The portion P4b opposes the external electrode 22 through the other bonding material 3 interposed therebetween. When viewed in the second direction D2, the outermost peripheral edge of the other bonding material 3 is located inside the outermost edge of the portion P4b and is separated from the outermost edge of the portion P4b. When viewed in the second direction D2, the outermost peripheral edge of the other bonding material 3 is located inside the side surface 54, the upper surface 55q, and the side surface 54p, and is separated from the side surface 54, the upper surface 55q, and the side surface 54p.

The electronic component ED1 according to the second modification includes the bonding material 5. The portion P2b is connected to an electronic device M1 through a bonding material 5.

A positional relationship between the internal conductor 11 and the metal terminal T1 will be described with reference to FIG. 6. When viewed in the first direction D1, both ends of the metal terminal T1 in the third direction D3 are defined by an end edge 33c and an end edge 34c. The end edge 33c is located on the outermost side of the metal terminal T1 in the third direction D3 on the side surface 33. The end edge 34c is located on the outermost side of the metal terminal T1 in the third direction D3 on the side surface 34. In the second modification, the end edge 33q is located on the outermost side of the metal terminal T1 in the third direction D3 on the side surfaces 33p. The end edge 34$q$ is located on the outermost side of the metal terminal T1 in the third direction D3 on the side surface 34$p$.

In the second modification, the end edge 11$a$ is located closer to the end edge 33$c$ than the end edge 11$b$. The end edge 11$a$ and the end edge 33$c$ give a shortest distance L1$a$ between each of the end edges 11$a$ and 11$b$ and the end edge 33$c$ in the third direction D3. The end edge 11$b$ is located closer to the end edge 34$c$ than the end edge 11$a$. The end edge 11$b$ and the end edge 34$c$ form a shortest distance L1$b$ between each of the end edges 11$a$ and 11$b$ and the end edge 34$c$ in the third direction D3. The end edge 11$a$ is located closer to the end edge 33$q$ than the end edge 11$b$. The end edge 11$a$ and the end edge 33$q$ give a shortest distance L3$a$ between each of the end edges 11$a$ and 11$b$ and the end edge 33$q$ in the third direction D3. The end edge 11$b$ is located closer to the end edge 34$q$ than the end edge 11$a$. The end edge 11$b$ and the end edge 34$q$ give a shortest distance L3$b$ between each of the end edges 11$a$ and 11$b$ and the end edge 34$q$ in the third direction D3.

In order to obtain the shortest distances L1$a$, L1$b$, L3$a$, and L3$b$, for example, the cross-sectional photograph of the electronic component ED1 at a position including the regions E1$a$ and E1$b$ is acquired. The cross-sectional photograph is a photograph of the cross section of the electronic component ED1 cut along a plane orthogonal to the side surfaces 1$c$1 and 1$c$2. The acquired cross-sectional photograph is subjected to image processing using software. On the basis of the result of the image processing, the boundary between the end edge 11$a$ and the end edge 33$c$ is determined to calculate the shortest distance L1$a$. The boundary between the end edge 11$b$ and the end edge 34$c$ is determined to calculate the shortest distance L1$b$. The boundary between the end edge 11$a$ and the end edge 33$q$ is determined to calculate the shortest distance L3$a$. The boundary between the end edge 11$b$ and the end edge 34$q$ is determined to calculate the shortest distance L3$b$.

The shortest distance L1$a$ and the shortest distance L1$b$ may be equal to each other or may be different from each other. The shortest distance L3$a$ and the shortest distance L3$b$ may be equal to each other or may be different from each other. In the second modification, the shortest distance L1$a$ is larger than the shortest distance L3$a$, and the shortest distance L1$b$ is larger than the shortest distance L3$b$. The shortest distances L1$a$ and L1$b$ are, for example, 0.5 to 1 mm. The shortest distances L3$a$ and L3$b$ are, for example, 0.34 to 0.88 mm.

Next, a positional relationship between the internal conductor 12 and the metal terminal T2 will be described. When viewed in the first direction D1, both ends of the metal terminal T2 in the third direction D3 are defined by an end edge 53$c$ and an end edge 54$c$. The end edge 53$c$ is located on the outermost side of the metal terminal T2 in the third direction D3 on the side surface 53. The end edge 54$c$ is located on the outermost side of the metal terminal T2 in the third direction D3 on the side surface 54. In the second modification, the end edge 53$q$ is located on the outermost side of the metal terminal T2 in the third direction D3 on the side surface 53$p$. The end edge 54$q$ is located on the outermost side of the metal terminal T2 in the third direction D3 on the side surface 54$p$.

In the second modification, the end edge 12$a$ is located closer to the end edge 53$c$ than the end edge 12$b$. The end edge 12$a$ and the end edge 53$c$ give a shortest distance L1$c$ between each of the end edges 12$a$ and 12$b$ and the end edge 53$c$ in the third direction D3. The end edge 12$b$ is located closer to the end edge 54$c$ than the end edge 12$a$. The end edge 12$b$ and the end edge 54$c$ give a shortest distance L1$d$ between each of the end edges 12$a$ and 12$b$ and the end edge 54$c$ in the third direction D3. The end edge 12$a$ is located closer to the end edge 53$q$ than the end edge 12$b$. The end edge 12$a$ and the end edge 53$q$ give a shortest distance L3$c$ between each of the end edges 12$a$ and 12$b$ and the end edge 53$q$ in the third direction D3. The end edge 12$b$ is located closer to the end edge 54$q$ than the end edge 12$a$, and the end edge 12$b$ and the end edge 54$q$ give a shortest distance L3$d$ between each of the end edges 12$a$ and 12$b$ and the end edge 54$q$ in the third direction D3.

In order to obtain the shortest distances L1$c$, L1$d$, L3$c$, and L3$d$, for example, the cross-sectional photograph of the electronic component ED1 at a position including the regions E2$a$ and E2$b$ is acquired. The cross-sectional photograph is a photograph of the cross section of the electronic component ED1 cut along a plane orthogonal to the side surfaces 1$c$1 and 1$c$2. The acquired cross-sectional photograph is subjected to image processing using software. On the basis of the result of the image processing, the boundary between the end edge 12$a$ and the end edge 53$c$ is determined to calculate the shortest distance L1$c$. The boundary between the end edge 12$b$ and the end edge 54$c$ is determined to calculate the shortest distance L1$d$. The boundary between the end edge 12$a$ and the end edge 53$q$ is determined to calculate the shortest distance L3$c$. The boundary between the end edge 12$b$ and the end edge 54$q$ is determined to calculate the shortest distance L3$d$.

The shortest distance L1$c$ and the shortest distance L1$d$ may be equal to each other or may be different from each other. The shortest distance L3$c$ and the shortest distance L3$d$ may be equal to each other or may be different from each other. In the second modification, the shortest distance L1$c$ is larger than the shortest distance L3$c$, and the shortest distance L1$d$ is larger than the shortest distance L3$d$. The shortest distances L1$c$ and L1$d$ are, for example, 0.5 to 1 mm. The shortest distances L3$c$ and L3$d$ are, for example, 0.34 to 0.88 mm.

The shortest distances L1$a$, L1$b$, L1$c$, and L1$d$ may be equal to each other or may be different from each other. The shortest distance L3$a$ and the shortest distance L3$c$ may be equal to each other or may be different from each other. The shortest distance L3$a$ and the shortest distance L3$d$ may be equal to each other or may be different from each other. The shortest distance L3$b$ and the shortest distance L3$c$ may be equal to each other or may be different from each other. The shortest distance L3$b$ and the shortest distance L3$d$ may be equal to each other or may be different from each other. The shortest distances L3$a$, L3$b$, L3$c$, and L3$d$ may be equal to each other or different from each other.

Next, the thicknesses of the terminal main bodies 7 and 8 will be described in detail.

In order to study the ranges of the thicknesses of the terminal main bodies 7 and 8, the present inventors conducted the following test. That is, the present inventors prepared samples S1 to S4 including the terminal main bodies 7 and 8 having thicknesses different from each other, and confirmed an equivalent series resistance (ESR) of each of the samples S1 to S4. The results are illustrated in FIG. 7. FIG. 7 is a table illustrating the ESR of each sample.

The ESR is determined as follows.

For example, ESR ($\Omega$) at the self-resonance frequency of each of the samples S1 to S4 is measured. An impedance analyzer is used to measure the ESR. As the impedance analyzer, for example, 4294A manufactured by Agilent Technologies is used. The samples S1 to S4 are mounted on a substrate for ESR measurement. The impedance analyzer is electrically connected to each of the samples S1 to S4, and the ESR (Ω) of each of the samples S1 to S4 is measured. A high-frequency signal having a frequency range of 10 kHz or more is applied to each of the samples S1 to S4. In consideration of actual use, the ESR needs to be 0.01Ω or less. The ESR of 0.01Ω or less tends not to increase the transmission loss due to the skin effect of the metal terminals T1 and T2 in the high frequency range.

In the sample S1, the ESR was more than 0.01Ω. In the samples S2 to S4, the ESR was 0.01Ω or less.

Next, the thickness of the Ni plated layer included in the metal layers 37 and 57 and the metal layers 38 and 58 will be described in detail.

In order to study the range of the thickness of the Ni plated layer, the present inventors conducted the following test. That is, the present inventors prepared samples S5 to S9 including the Ni plated layers having thicknesses different from each other, and confirmed the ESR and crotch tear strength of each of the samples S5 to S9.

A Ni plated layer was formed through a plating method, and the thickness of the Ni plated layer was controlled due to changing a time for forming plating. In each of the samples S5 to S9, two samples each including a Ni plated layer having the same thickness were prepared, the ESR was confirmed for one sample, and the crotch tear strength was confirmed for the remaining samples.

The results are illustrated in FIG. 8. FIG. 8 is a table illustrating an ESR and crotch tear strength of each sample.

The ESR is determined for the samples S5 to S9 through the same test as the test for the thicknesses of the terminal main bodies 7 and 8. In consideration of actual use, the ESR needs to be 0.01Ω or less as described above.

The crotch tear strength is determined as follows.

For example, the crotch tear strength (N) of each of the samples S5 to S9 is measured. A tensile tester is used to measure the crotch tear strength. In a state where the metal terminal T1 is fixed, the metal terminal T2 is pulled in a direction away from the metal terminal T1. For each of the samples S5 to S9, tensile strength (N) when the metal terminal T2 is damaged is measured. The tensile strength (N) is defined as the crotch tear strength (N). The breakage of the metal terminal T2 includes, for example, peeling of the metal terminal T2 from the component body MD1.

In consideration of actual use, the crotch tear strength needs to be 20 N or more. When the crotch tear strength is 20 N or more, the metal terminals T1 and T2 exhibit high mechanical strength.

In the sample S5, the ESR was 0.01Ω or less, and the crotch tear strength was less than 20 N. In the samples S6 to S8, the ESR was 0.01Ω or less, and the crotch tear strength was 20 N or more. In the sample S9, the ESR was more than 0.01Ω, and the crotch tear strength was 20 N or more.

Next, the shortest distances L1a, L1b, L1c, and L1d will be described in detail.

In order to study the ranges of the shortest distances L1a, L1b, L1c, and L1d, the present inventors conducted the following test. That is, the present inventors prepared samples S10 to S12 having shortest distances L1a different from each other, and confirmed the ESR of each of the samples S10 to S12.

The results are illustrated in FIG. 9. FIG. 9 is a table illustrating an ESR of each sample; and Samples having different shortest distances L1a, L1b, L1c, and L1d are prepared, for example, due to changing the lengths of the portions P1a and P2a in the third direction D3.

The ESR is determined due to selecting a specimen for each of the samples S10 to S12, and subjecting each specimen to the same test as the test for the thicknesses of the terminal main bodies 7 and 8. In consideration of actual use, the ESR needs to be 0.01Ω or less.

In the samples S10 to S11, the ESR was 0.01Ω or less. In the sample S12, the ESR was more than 0.01Ω.

Next, the shortest distances L3a, L3b, L3c, and L3d will be described in detail.

In order to study the ranges of the shortest distances L3a, L3b, L3c, and L3d, the present inventors conducted the following test. That is, the present inventors prepared samples S13 to S15 having shortest distances L3a different from each other, and confirmed the ESR of each of the samples S13 to S15.

The results are illustrated in FIG. 10. FIG. 10 is a table illustrating an ESR of each sample. The samples having different shortest distances L3a, L3b, L3c, and L3d are prepared, for example, due to changing the length of at least any one of the portions P3a, P3b, P4a, and P4b and the regions E1a and E2a in the third direction D3.

The ESR is determined due to selecting a specimen for each of the samples S13 to S15, and subjecting each specimen to the same test as the test for the thicknesses of the terminal main bodies 7 and 8. In consideration of actual use, the ESR needs to be 0.01Ω or less.

In the samples S13 to S14, the ESR was 0.01Ω or less. In the sample S15, the ESR was more than 0.01Ω.

As described above, the electronic component ED1 includes the component body MD1, the metal terminals T1 and T2, and the bonding materials 2 and 3.

In the electronic component ED1, each of the metal layers 37, 38, 57, and 58 includes a Ni plated layer. Therefore, even in a configuration in which the terminal main bodies 7 and 8 include Cu and the bonding materials 2 and 3 include solder, solder leaching tends not to occur in the terminal main bodies 7 and 8. As a result, the electronic component ED1 reduces a decrease in the mechanical strength of the metal terminals T1 and T2.

In the high frequency range, a skin effect occurs, in which a current tends to flow near the surface of the metal terminal Ni is a magnetic material. For example, the skin depth of a conductor including Ni is smaller than the skin depth of a conductor including Cu. The conductor including Ni increases the transmission loss due to the skin effect in the high frequency range as compared with the conductor including Cu.

In the electronic component ED1, in the high frequency range, a current tends to flow near the surfaces of the metal terminals T1 and T2. The terminal body 7 including Cu is exposed at the side surfaces 33 and 34, and the terminal body 8 including Cu is exposed at the side surfaces 53 and 54. Ni tends not to be exposed at the side surfaces 33, 34, 53, and 54. Therefore, the electronic component ED1 reduces an increase in the transmission loss due to the skin effect in the high frequency range.

In the electronic component ED1, Cu included in the terminal body 7 is exposed at the side surfaces 33 and 34, and Cu included in the terminal body 8 is exposed at the side surfaces 53 and 54.

The electronic component ED1 certainly reduces an increase in the transmission loss due to the skin effect in the high frequency range.

In the electronic component ED1, the metal terminal T1 includes a plurality of portions P3a and P3b opposing the external electrode 21, connected to the bonding material 2, and separated from each other. The metal terminal T2 includes a plurality of portions P4a and P4b opposing the external electrode 22, connected to the bonding material 3, and separated from each other.

In the electronic component ED1, the ratio of the side surfaces 33, 34, 33p, and 34p and the surface 35r to the outer surface of the metal terminal T1 increases. The ratio of the side surfaces 53, 54, 53p, and 54p and the surface 55r to the outer surface of the metal terminal T2 increases. Therefore, the electronic component ED1 more certainly reduces an increase in the transmission loss due to the skin effect in the high frequency range.

In the electronic component ED1, the terminal main bodies 7 and 8 have a thickness of 0.05 mm or more.

The electronic component ED1 still more certainly reduces an increase in the transmission loss due to the skin effect in the high frequency range.

In the electronic component ED1, the Ni plated layer has a thickness of 1 to 4 μm.

The electronic component ED1 still more certainly reduces an increase in the transmission loss due to the skin effect in the high frequency range.

In the electronic component ED1, the metal layers 37, 38, 57, and 58 include a Sn plated layer.

The electronic component ED1 still more certainly reduces an increase in the transmission loss due to the skin effect in the high frequency range.

In the electronic component ED1, the shortest distances L1a, L1b, L1c, and L1d are 0.5 to 1 mm.

The electronic component ED1 still more certainly reduces an increase in the transmission loss due to the skin effect in the high frequency range.

In the electronic component ED1, the shortest distances L3a, L3b, L3c, and L3d are 0.34 to 0.88 mm.

The electronic component ED1 still more certainly reduces an increase in the transmission loss due to the skin effect in the high frequency range.

In the electronic component ED1, the metal terminal T1 includes the portion P1b, and the metal terminal T2 includes the portion P2b.

In the electronic component ED1, the portions P1b and P2b function as a mounting area to be connected to the electronic device M1.

In the electronic component ED1, the side surfaces 33 and 34 include surfaces 33a and 34a and surfaces 33b and 34b. The side surfaces 53 and 54 include surfaces 53a and 54a and surfaces 53b and 54b.

The electronic component ED1 increases the ratio of the side surfaces 33 and 34 to the outer surface of the metal terminal T1. The electronic component ED1 increases the ratio of the side surfaces 53 and 54 to the outer surface of the metal terminal T2. The electronic component ED1 still more certainly reduces an increase in the transmission loss due to the skin effect in the high frequency range.

Although the examples and modifications of the present disclosure have been described above, the present disclosure is not necessarily limited to the above-described examples and modifications can be made without departing from the gist thereof.

In the electronic component ED1 illustrated in FIGS. 5 and 6, the shortest distance L1a may be equal to or less than the shortest distance L3a. The shortest distance L1b may be equal to or less than the shortest distance L3b.

In the present examples and modifications, the electronic component ED1 has been described as the multilayer ceramic capacitor, but the electronic component to which the present disclosure can be applied is not limited to the multilayer ceramic capacitor. The electronic component to which the present disclosure can be applied include, for example, a multilayer varistor, a multilayer piezoelectric actuator, a multilayer thermistor, and a multilayer solid state battery.

What is claimed is:

1. An electronic component comprising:
   a component body including an element body and an external electrode disposed on the element body;
   a metal terminal including a first main surface and a second main surface opposing each other, and a side surface coupling the first main surface and the second main surface; and
   a bonding material disposed between the external electrode and the first main surface and electrically and physically connecting the external electrode and the metal terminal,
   wherein:
   the metal terminal includes a first metal layer including the first main surface, a second metal layer including the second main surface, and a terminal body including the side surface, and includes:
      a first portion connected to the external electrode and extending in a first direction,
      a second portion extending in a second direction intersecting the first direction, and
      a third portion continuous with the first portion and the second portion and connecting the first portion and the second portion;
   the side surface includes:
      a first surface included in the first portion and extending in the first direction,
      a second surface included in the second portion and extending in the second direction, and
      a third surface included in the third portion and continuous with the first surface and the second surface;
   the terminal body is exposed at an entirety of the first surface, the second surface, and the third surface, and the first metal layer and the second metal layer are separated from each other on the entirety of the first surface, the second surface, and the third surface;
   each of the first metal layer and the second metal layer includes a Ni plated layer;
   the terminal body includes Cu; and
   the bonding material includes solder.

2. The electronic component according to claim 1, wherein
   Cu included in the terminal body is exposed at the side surface.

3. The electronic component according to claim 1, wherein:
   the metal terminal includes a plurality of portions opposing the external electrode, connected to the bonding material, and separated from each other;
   each of the plurality of portions includes a surface exposed to a space between the plurality of portions; and
   the side surface includes the surface included in each of the plurality of portions.

4. The electronic component according to claim 1, wherein
   the terminal body has a thickness of 0.05 mm or more.

5. The electronic component according to claim 1, wherein
   the Ni plated layer has a thickness of 1 to 4 μm.

6. The electronic component according to claim 1, wherein:
   the first metal layer includes a Sn plated layer including the first main surface; and the second metal layer includes a Sn plated layer including the second main surface.

7. The electronic component according to claim 1, wherein:
the component body further includes an internal conductor disposed in the element body and electrically and physically connected to the external electrode;
the internal conductor includes
a first region physically connected to the external electrode, and
a second region continuous with the first region and having a width larger than the width of the first region; and
the first region includes an end edge that is separated from an end edge of the side surface in a width direction of the first region by a shortest distance of 0.5 to 1 mm.

8. The electronic component according to claim 1, wherein:
the component body further includes an internal conductor disposed in the element body and electrically and physically connected to the external electrode;
the internal conductor includes
a first region physically connected to the external electrode, and
a second region continuous with the first region and having a width larger than the width of the first region; and
the first region includes an end edge that is separated from an end edge of the terminal body in a width direction of the first region by a shortest distance of 0.34 to 0.88 mm.

9. The electronic component according to claim 1, wherein:
the component body further includes a plurality of internal conductors disposed in the element body and opposing each other; and
the metal terminal includes:
a first portion connected to the external electrode and extending in a direction in which the plurality of internal conductors oppose each other; and
a second portion extending in a direction intersecting the direction in which the plurality of internal conductors oppose each other.

10. The electronic component according to claim 1, wherein:
the metal terminal further includes a metal layer formed on at least one of an upper surface included in the first portion and connecting the first main surface and the second main surface or a lower surface included in the second portion and connecting the first main surface and the second main surface.

* * * * *